(12) United States Patent
Toshitani

(10) Patent No.: US 7,042,911 B2
(45) Date of Patent: May 9, 2006

(54) SYNCHRONIZATION CONTROL DEVICE

(75) Inventor: Masafumi Toshitani, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 982 days.

(21) Appl. No.: 09/969,522

(22) Filed: Oct. 2, 2001

(65) Prior Publication Data

US 2003/0063627 A1 Apr. 3, 2003

(51) Int. Cl.
*H04J 3/06* (2006.01)

(52) U.S. Cl. ...................... 370/503; 370/412

(58) Field of Classification Search ............... 370/412, 370/503, 504, 506, 510; 375/354, 355
See application file for complete search history.

(56) References Cited

U.S. PATENT DOCUMENTS

| | | | |
|---|---|---|---|
| 4,472,803 A * | 9/1984 | Iijima | 370/522 |
| 5,452,010 A * | 9/1995 | Doornink | 348/497 |
| 6,092,142 A | 7/2000 | Mehta et al. | |
| 6,400,683 B1 * | 6/2002 | Jay et al. | 370/229 |
| 6,721,328 B1 * | 4/2004 | Nichols et al. | 370/395.62 |

FOREIGN PATENT DOCUMENTS

| | | |
|---|---|---|
| EP | 0503657 | 3/1992 |
| EP | 0558136 | 2/1993 |

\* cited by examiner

*Primary Examiner*—Ricky Q. Ngo
*Assistant Examiner*—Christine Ng
(74) *Attorney, Agent, or Firm*—Pillsbury Winthrop Shaw Pittman LLP

(57) ABSTRACT

In a synchronization control device, received AC 3 coded data or zero data are written into a FIFO buffer in synchronism with bus clock pulses, while yet-to-be-read data are read out from the first-in-first-out buffer. When a difference between the quantity of the yet-to-be-read data in the FIFO buffer and a value represented by synchronization point information is outside an allowable range, a synchronism evaluation section controls a rate of the data readout from the FIFO buffer in such a manner that the difference falls within the allowable range. Synchronization point control section detects leading packet data from among a plurality of successive packet data sequentially arriving in synchronism with the bus clock pulses, and controls the value of the synchronization point information in accordance with a period between the detected leading packet data and next detected leading packet data. With such arrangements, the synchronization control device permits appropriate synchronized reproduction of the received AC 3 coded data without adverse effects on synchronism evaluation by the synchronism evaluation section.

10 Claims, 9 Drawing Sheets

SYNCHRONIZATION CONTROL DEVICE

BACKGROUND OF THE INVENTION

The present invention relates to a synchronization control device suitable for receiving isochronously-transferred packet data to perform synchronized reproduction of the received packet data.

The USB (acronym for Universal Serial Bus) is being widely used today as one type of cable interconnecting digital equipment. In recent years, there has been supplied a great variety of digital equipment connectable via the USB to other equipment, and thus the applications of the USB have been getting even wider and wider. Among various known forms of data transfer using the USB is the isochronous transfer which repeats packet data transfer from a transmitting end to a receiving end in response to bus clock pulses generated with one-msec. cycles. (hereinafter called "USB frames").

The assignee of the present application has proposed and carried out performance studies on an audio communication system that uses the USB-based isochronous transfer scheme to transmit coded data, such as AC 3 (Audio Code 3) data. FIG. 7 is a block diagram schematically showing a general organization of the audio communication system proposed by the assignee of the present application. As shown, the audio communication system includes a computer 1 and an audio reproduction apparatus 2 interconnected via a USB 3. The computer 1 includes a DVD (Digital Versatile Disk) drive (not shown) for receiving and driving a DVD having AC 3 coded data recorded thereon. The computer 1 also includes an AC 3 data reproduction section 101 and a USB interface unit 102.

Functions of the AC 3 data reproduction section 101 and USB interface unit 102 are described with reference to sections (a) to (c) of FIG. 8. The AC 3 data reproduction section 101 functions to reproductively read out AC 3 coded data from a not-shown DVD. The AC 3 coded data recorded on the DVD are data obtained by sampling audio signals with 48-kHz sampling clock pulses to provide PCM samples and then performing compression coding on each group of 1,536 PCM samples (see section (a) of FIG. 8). For each synchronized frame of a 32 (32=1,536/48 kHz)-msec. period, the AC 3 data reproduction section 101 reads out and outputs the AC 3 coded data corresponding to 1,536 PCM samples (see section (b) of FIG. 8).

The USB interface unit 102 combines the AC 3 coded data, output from the AC 3 data reproduction section 101 for each synchronized frame, into one or more packet data, and transfers one such packet data to the audio reproduction apparatus 2, via the USB 3, per USB frame of a one-msec. period. Because the AC 3 coded data output from the AC 3 data reproduction section 101 in the synchronized frame have undergone the compression coding, the AC 3 coded data to be transferred as the packet may run out in one of 32 USB frames within the synchronized frame. In such a case, the USB interface unit 102 transfers "0 (zero)" data in each of the remaining USB frames within the synchronized frame. The foregoing are an overview of the functions of the AC 3 data reproduction section 101 and the USB interface unit 102.

The audio reproduction apparatus 2 shown in FIG. 7 should be able to reproduce the audio signals as before the compression coding based on the AC 3 scheme, by receiving and decoding the packets of the AC 3 coded data sent from the computer 1 via the USB 3.

However, with the above-discussed audio communication system, it is difficult for the audio reproduction apparatus 2 to reproduce the AC 3 coded data in a synchronized manner without deterioration in quality of the reproduced data. The reasons for the reproduction quality deterioration are explained below with reference to FIG. 9.

The USB interface unit 102 operates in synchronism with clock pulses separate from timing-controlling clock pulses of the AC 3 data reproduction section 101. Therefore, the frequency of bus clock pulses in the USB interface unit 102 does not necessarily coincide with 32 times the frequency of the synchronized frames and thus would become slightly lower or higher than 32 times the frequency of the synchronized frames constantly or temporarily. If the frequency of the bus clock pulses in the USB interface unit 102 is lower than 32 times the frequency of the synchronized frames, the 32 USB packets of a given synchronized frame SyncF-1 can be transferred at appropriate timing in accordance with the bus clock pulses, but afterwards the phase of the bus clock pulses would gradually lag behind the phase of the synchronized frames as the time passes, as illustratively shown in section (a) of FIG. 9. Consequently, at a subsequent synchronized frame SyncF-M1, there would occur a situation in which, even when timing has arrived to transmit the first or leading packet of the AC 3 coded data output in the synchronized frame SyncF-M1, transmission of the last (32nd) packet in the immediately-preceding synchronized frame has not yet been completed.

If, on the other hand, the frequency of the bus clock pulses in the USB interface unit 102 is higher than 32 times the frequency of the synchronized frames, the phase of the bus clock pulses would gradually lead the phase of the synchronized frames as the time passes, as illustratively shown in section (b) of FIG. 9. Thus, as illustrated in section (b) of FIG. 9, there would occur a situation in which, even when timing has arrived, after transmission of the last (32nd) packet in a given synchronized frame SyncF-M2, to transmit the first or leading packet of the AC 3 coded data to be output in the next synchronized frame, the first or leading packet can not be generated in time.

In order to cope with such situations, the USB interface unit 102 performs the following control. In the case of section (a) of FIG. 9, the USB interface unit 102 performs the control for terminating the packet transfer after completion of the transmission of the 31st packet in the synchronized frame preceding the frame SyncF-M1. In the case of section (b) of FIG. 9, the USB interface unit 102 performs the control for, after completion of the transmission of the 32nd packet, transferring an extra, 33rd packet (consisting of "0" data) in the synchronized frame SyncF-M2 in synchronism with a subsequent bus clock pulse. Even when the frequency of the bus clock pulses in the USB interface unit 102 does not exactly coincide with 32 times the frequency of the synchronized frames, such packet transfer control allows all of the AC 3 coded data output from the AC 3 data reproduction section 101 to be transferred with no delay in each of the synchronized frames. However, as a result of the packet transfer control, undesired jitters corresponding in time length to one USB frame would be produced in reception timing of the AC 3 coded data in the audio reproduction apparatus 2 of FIG. 7, as illustratively shown in sections (c) and (d) of FIG. 9.

In the illustrated example of section (c) of FIG. 9, the 32 USB packets are appropriately transferred in almost all of the synchronized frames; however, on some rare occasion, only 31 USB packets are transferred in a given synchronized frame. Ideally, the AC 3 coded data, to be received by the audio reproduction apparatus 2 in the synchronized frame immediately following the given synchronized frame, should be received only one USB frame later. Further, in the illustrated example of section (d) of FIG. 9, the 32 USB packets are appropriately transferred in almost all of the synchronized frames; however, on some rare occasion, 33 USB packets are transferred in a given synchronized frame. Ideally, the AC 3 coded data, to be received by the audio reproduction apparatus 2 in the synchronized frame immediately following the given synchronized frame, should be received only one USB frame earlier. Here, the audio reproduction apparatus 2 performs synchronized reproduction of the AC 3 coded data in synchronism with each 32-msec. synchronized frame (that is asynchronous with the synchronized frame of the AC 3 data reproduction section 101 in the computer 1). Specifically, the synchronized reproduction of the AC 3 coded data is performed by sequentially storing the packets of the AC 3 coded data in a FIFO (First-In-First-Out) buffer and then performing a so-called synchronism test or evaluation so as to control the packet readout frequency in the FIFO buffer in accordance with the result of the synchronism evaluation. Thus, if jitters corresponding in time length to one USB frame are produced at the reception timing of the AC 3 coded data in the audio reproduction apparatus 2, the jitters would adversely affect the synchronism evaluation and thereby raise the problem that the synchronized reproduction of the AC 3 coded data can not be performed appropriately.

SUMMARY OF THE INVENTION

In view of the foregoing, it is an object of the present invention to provide a synchronization control device which permits proper synchronized reproduction of audio data, isochronously transferred via a USB, while effectively avoiding adverse effects on a synchronism evaluation operation.

According to one aspect of the present invention, there is provided a synchronization control device for sequentially receiving packet data in synchronism with periodic bus clock pulses and outputting one or more received packet data collectively as a data train for each synchronized frame having a period longer than a generating period of the bus clock pulses, which comprises: a first-in-first-out buffer; a write control section that writes received packet data or zero data into the first-in-first-out buffer in synchronism with the bus clock pulses; a read control section that reads out yet-to-be-read data from the first-in-first-out buffer; a synchronism evaluation section that, when a difference between a specific quantity of the yet-to-be-read data in the first-in-first-out buffer and a value represented by synchronization point information is outside an allowable range, controls a data readout rate of the read control section in such a manner that the difference falls within the allowable range; and a synchronization point control section that supplies the synchronization point information to the synchronism evaluation section, the synchronization point control section detecting leading packet data from among a plurality of successive packet data sequentially arriving in synchronism with the bus clock pulses. When a period from the detected leading packet data to next detected leading packet data has become shorter than the period of the synchronized frame, the synchronization point control section inserts a predetermined quantity of zero data immediately before the next detected leading packet data in the first-in-first-out buffer. In this case, the synchronization point control section may perform control to decrease the value of the synchronization point information by a predetermined amount and then progressively restore the synchronization point information to an initial value.

According to another aspect of the present invention, there is provided a synchronization control device for sequentially receiving packet data in synchronism with periodic bus clock pulses and outputting one or more received packet data collectively as a data train for each synchronized frame having a period longer than a generating period of the bus clock pulses, which comprises: a first-in-first-out buffer; a write control section that writes received packet data or zero data into the first-in-first-out buffer in synchronism with the bus clock pulses; a read control section that reads out yet-to-be-read data from the first-in-first-out buffer; a synchronism evaluation section that, when a difference between a specific quantity of the yet-to-be-read data in the first-in-first-out buffer and a value represented by synchronization point information is outside an allowable range, controls a data readout rate of the read control section in such a manner that the difference falls within the allowable range; and a synchronization point control section that supplies the synchronization point information to the synchronism evaluation section, the synchronization point control section detecting leading packet data from among a plurality of successive packet data sequentially arriving in synchronism with the bus clock pulses. When a period from the detected leading packet data to next detected leading packet data has become longer than the period of the synchronized frame, the synchronization point control section increases the value of the synchronization point information by a predetermined amount. In this case, the synchronization point control section may perform control to progressively restore the synchronization point information to an initial value after having increased the value of the synchronization point information by the predetermined amount.

According to still another aspect of the present invention, there is provided a synchronization control device for sequentially receiving packet data in synchronism with periodic bus clock pulses and outputting one or more received packet data collectively as a data train for each synchronized frame having a period longer than a generating period of the bus clock pulses, which comprises: a first-in-first-out buffer; a write control section that writes received packet data or zero data into the first-in-first-out buffer in synchronism with the bus clock pulses; a read control section that reads out yet-to-be-read data from the first-in-first-out buffer; a synchronism evaluation section that, when a difference between a specific quantity of the yet-to-be-read data in the first-in-first-out buffer and a value represented by synchronization point information is outside an allowable range, controls a data readout rate of the read control section in such a manner that the difference falls within the allowable range; a preamble generation section that generates a preamble on the basis of leading packet data from among a plurality of successive packet data arriving in synchronism with the bus clock pulses; and a synchronization point control section that supplies the synchronization point information to the synchronism evaluation section. When the synchronization point control section detects the leading packet data from among the plurality of successive packet data sequentially arriving in synchronism with the bus clock pulses, the synchronization point control section shifts the value of the synchronization point information by an amount corresponding to a data length of the preamble to thereby supply the shifted value of the synchronization point information to the synchronism evaluation section and then restores the synchronization point information to an initial value after synchronism evaluation by the synchronism evaluation section.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE PREFERRED EMBODIMENTS

The following will describe embodiments of the present invention, but it should be appreciated that the present invention is not limited to the described embodiments alone and various modifications of the invention are possible without departing from the basic principles of the invention. The scope of the present invention is therefore to be determined solely by the appended claims.

Figure 1:
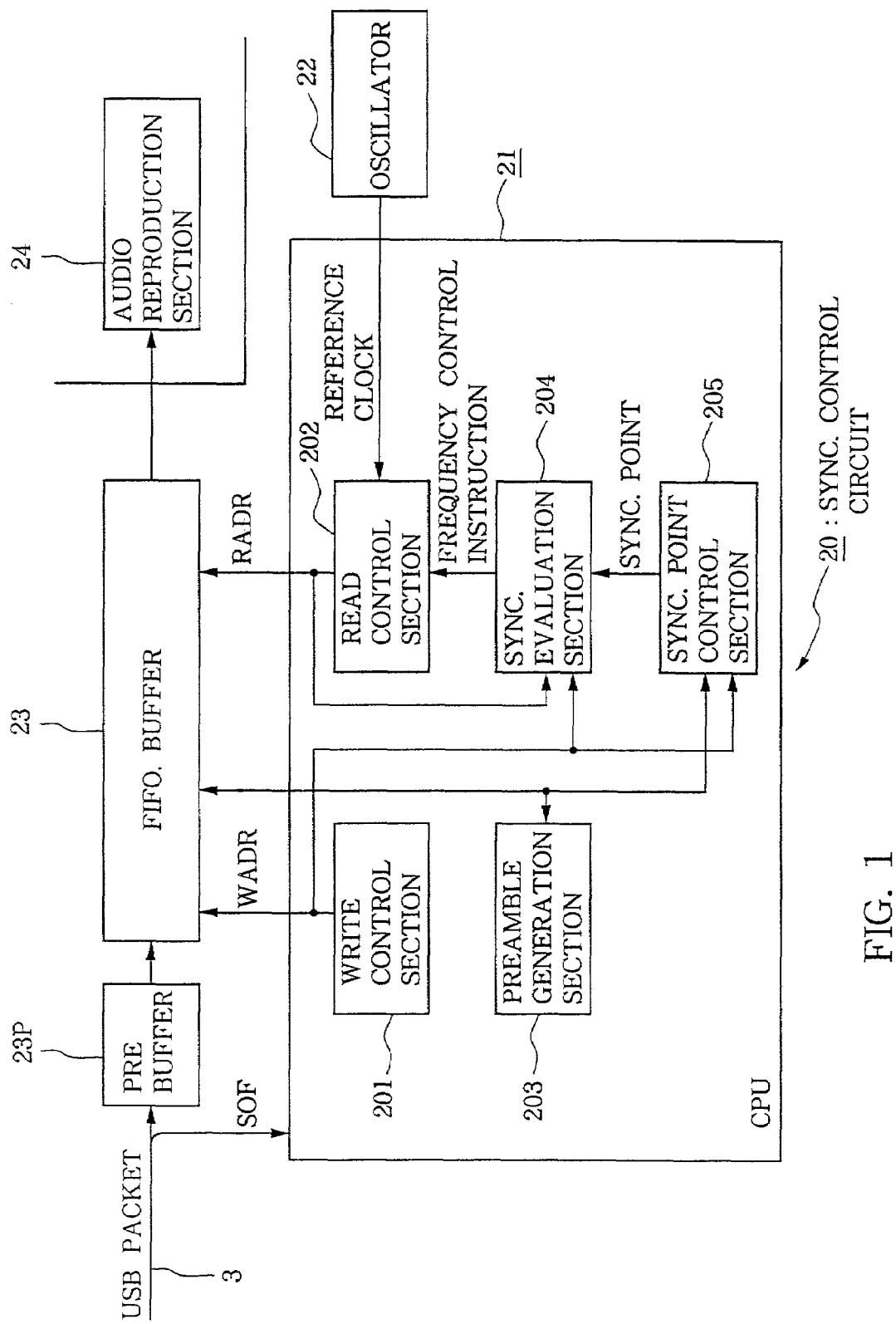
FIG. 1 is a block diagram showing an exemplary general setup of a synchronization control circuit in accordance with an embodiment of the present invention.
Figure 7:
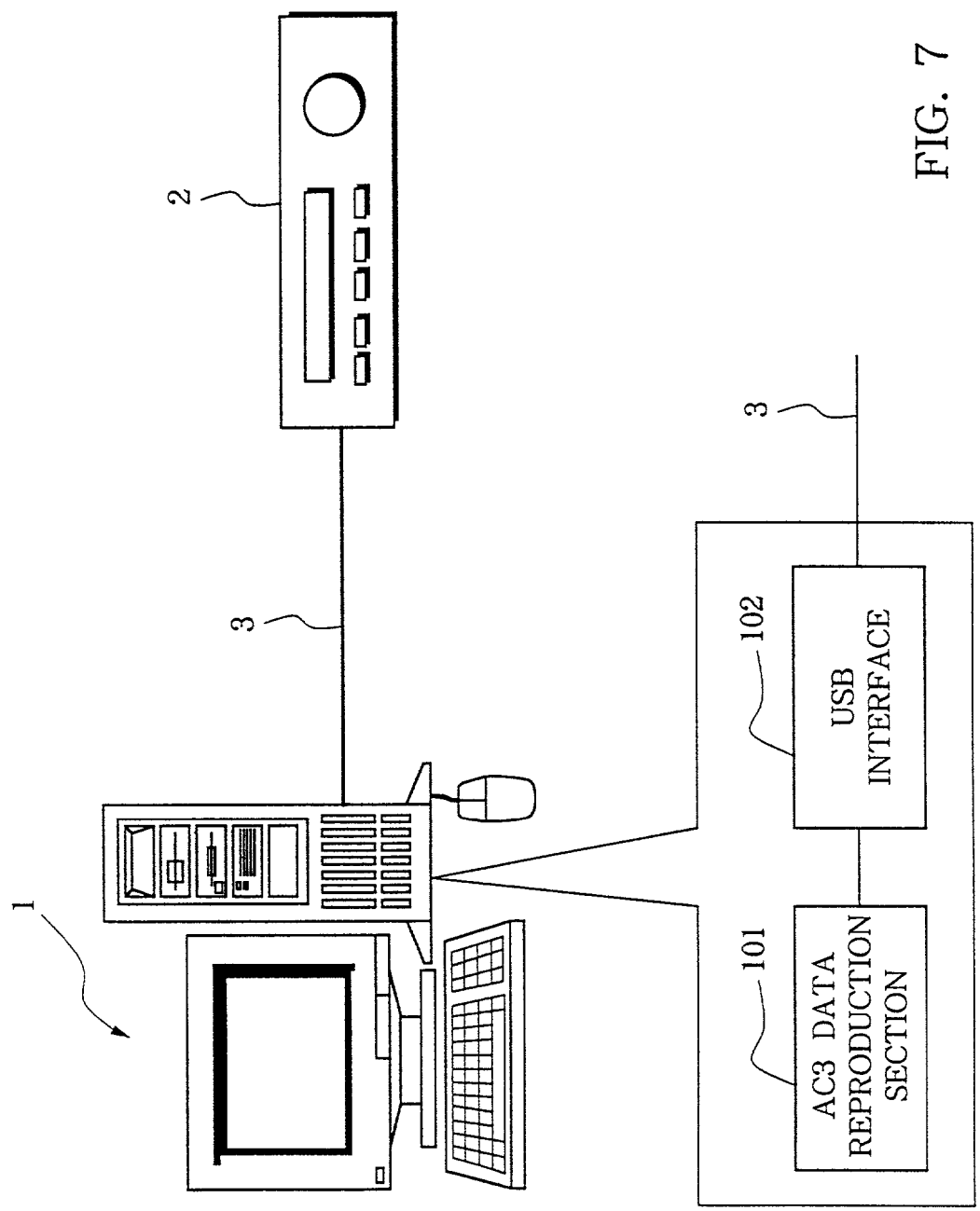
FIG. 7 is a block diagram schematically showing a general organization of an audio communication system to which the present invention is applied.
Figure 8:
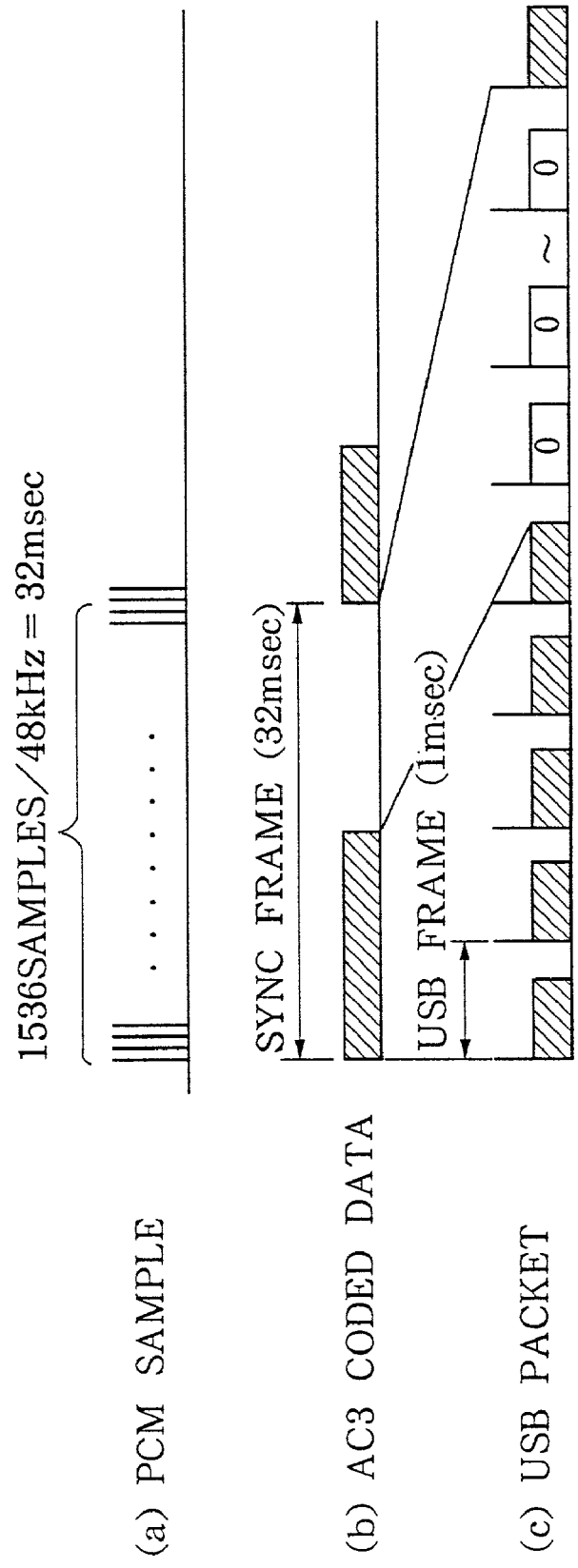
FIG. 8 is a time chart explanatory of behavior of an AC 3 data reproduction section and USB interface unit in the audio communication system of FIG. 7.
Figure 9:
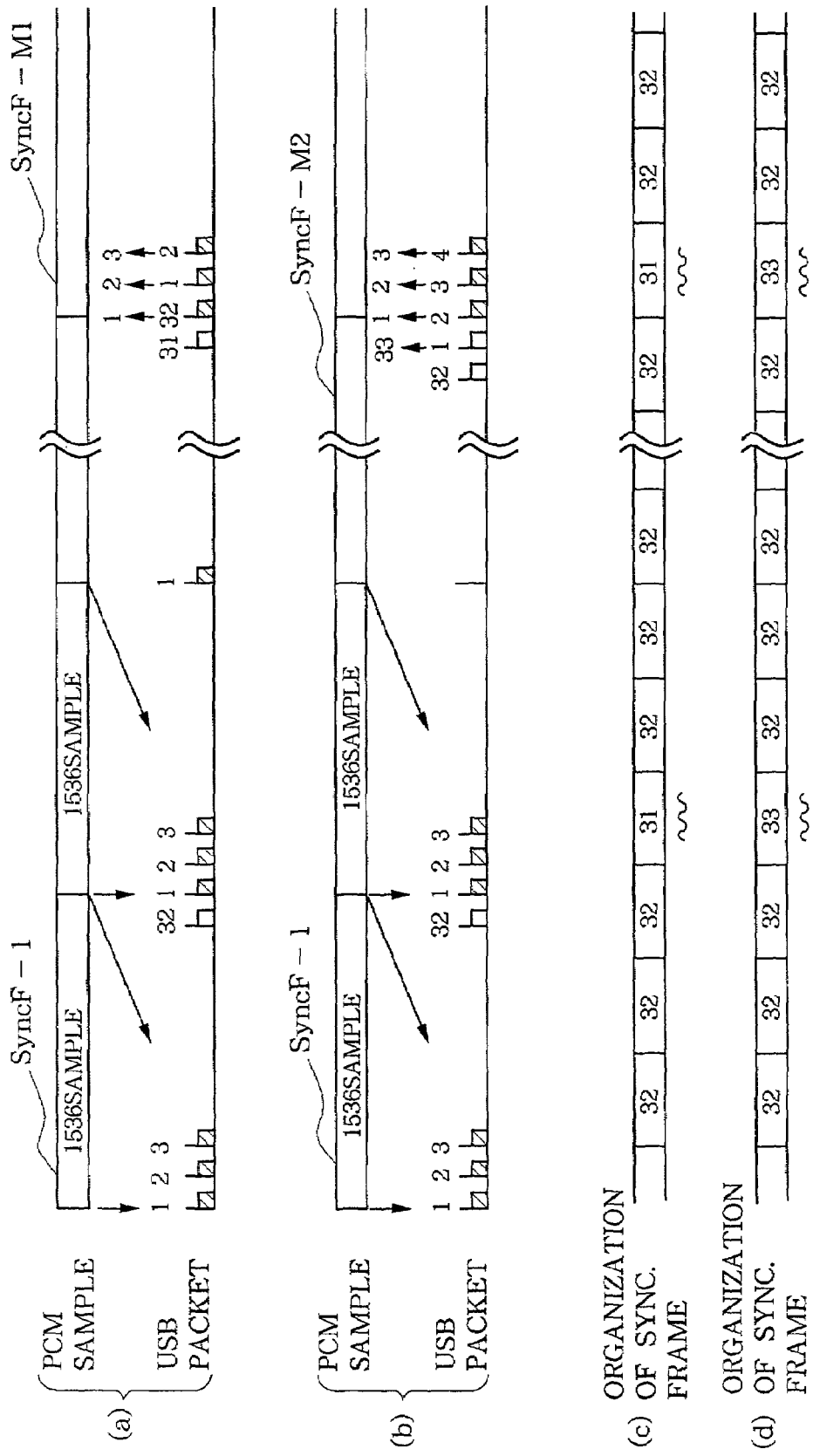
FIG. 9 is a time chart explanatory of jitters produced during an isochronous transfer, via a USB, of AC 3 coded data.

FIG. 1 is a block diagram showing a general organization of an audio reproduction section 24 and a synchronization control circuit 20 in accordance with an embodiment of the present invention. Each of the elements illustrated here is preferably provided in an audio reproduction apparatus such as the one shown in FIG. 7. The synchronization control circuit 20 includes a CPU 21, an oscillator 22 external to the CPU 21, a prebuffer 23P, and a FIFO (First-In-First-Out) buffer 23 implemented by a dual-port RAM or the like. By means of the prebuffer 23P and FIFO buffer 23, the CPU 21 buffers USB packets isochronously transferred via a USB 3. Thus, the CPU 21 generates AC 3 data converted into a format corresponding to the IEC 958 standard and supplies the generated AC 3 data to an audio reproduction section 24.

Figure 2:
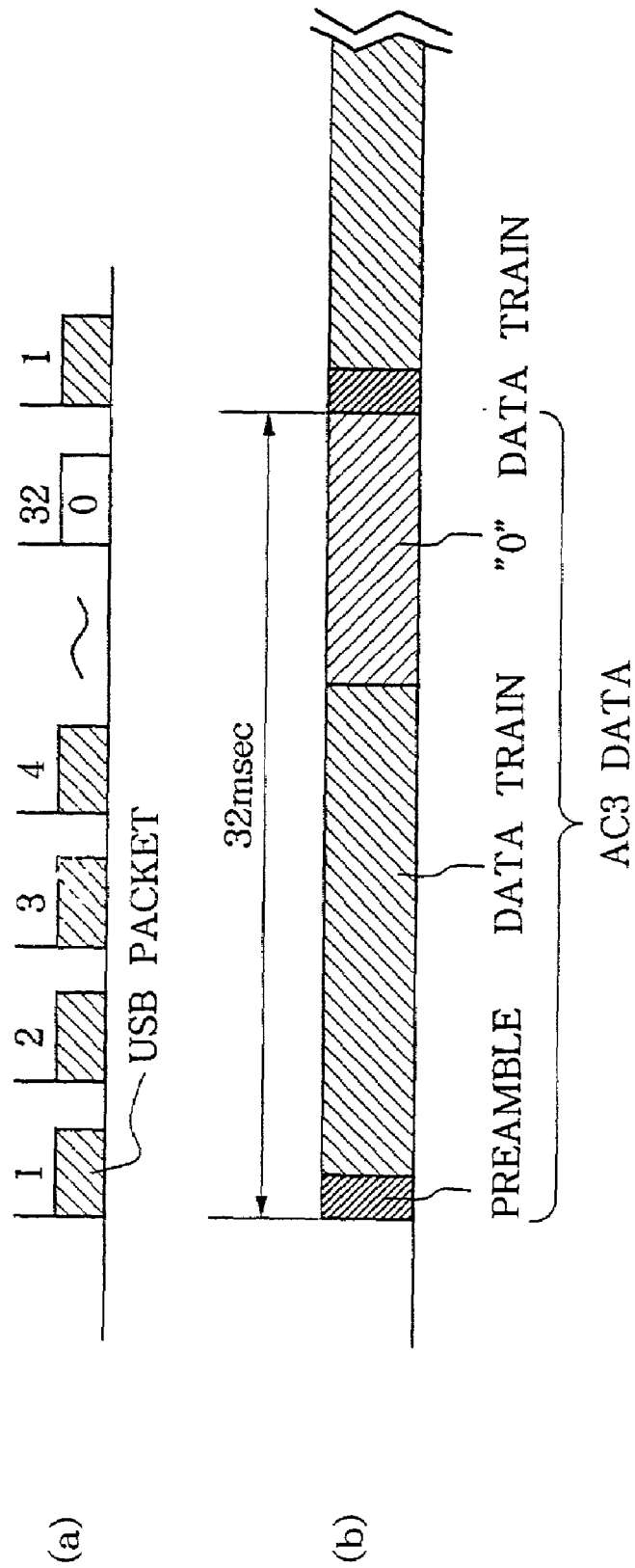
FIG. 2 is a diagram showing a plurality of USB packets sequentially arriving at the synchronization control circuit of FIG. 1, and AC 3 data converted into a format corresponding to the IEC 958 standard to be output from the synchronization control circuit.

Section (a) of FIG. 2 shows a plurality of the USB packets sequentially arriving at the synchronization control circuit 20, and section (b) of FIG. 2 shows the AC 3 data converted into the format corresponding to the IEC 958 standard. In section (a) of FIG. 2, one USB packet is transmitted to the control circuit 20 per one-msec. USB frame. Thus, where each synchronized frame has a 32-msec. time length or period, the synchronization control circuit 20 receives 32 USB packets in the synchronized frame. Each of the USB packets includes, as its payload, 192 bytes of the AC 3 coded data or "0 (zero)" data. The USB packets sequentially arriving at the synchronization control circuit 20 are each first temporarily stored into the prebuffer 23P and then delivered to the FIFO buffer 23 after being delayed by a time length corresponding to a predetermined number of the USB frames. Further, as shown in section (b) of FIG. 2, the AC 3 data converted into the format corresponding to the IEC 958 standard include a preamble, a train of data obtained by arranging, in order of reception by the control circuit 20, the AC 3 coded data received within the synchronized frame, and a train of "0" data. The synchronization control circuit 20 reads out, from the FIFO buffer 23, the AC 3 data converted into the format corresponding to the IEC 958 standard during each synchronized frame defined by the AC 3 scheme (i.e., during each synchronized frame based on the IEC 958 standard), in accordance with read clock pulses (e.g., pulses of a 48-kHz sampling frequency) obtained by frequency-dividing reference clock pulses generated by the oscillator 22.

Referring back to FIG. 1, the CPU 21 includes a write control section 201, a read control section 202, a preamble generation section 203, a synchronism evaluation section 204 and a synchronization point control section 205. These sections represent various functions, carried out by the CPU 21 running predetermined software, as virtual hardware modules; of course, these sections or modules may be implemented by hardware.

Each time the USB packet is received via the USB 3 and stored into the prebuffer 23P, the write control section 201 performs control to supply sequentially-incrementing write addresses to the FIFO buffer 23, read out the payload of the USB packet, AC 3 coded data or "0" data, from the prebuffer 23P and then write the thus read-out data into the FIFO buffer 23.

The read control section 202 reads out the AC 3 coded data or "0" data from the FIFO buffer 23 in the chronological order (i.e., in the order the data were stored into the FIFO buffer 23), and then supplies the audio reproduction section 24 with the thus read-out data as the AC 3 data converted into the format corresponding to the IEC 958 standard. Although not specifically shown, this read control section 202 includes a frequency divider of a variable frequency division ratio for frequency-dividing reference clock pulses output from the oscillator 22 or the like, a counter for counting the clock pulses output from the frequency divider to supply the FIFO buffer 23 with a predetermined counted value of the pulses as a read address RADR, and a circuit for compulsorily manipulating the counted value output from the counter.

The preamble generation section 203 creates a preamble of the AC 3 data converted into the format corresponding to the IEC 958 standard, on the basis of the AC 3 coded data within the USB packet that has been received in the first USB frame of the synchronized frame and stored into the FIFO buffer 23. The preamble thus created by the preamble generation section 203 is written via the write control section 201 into a predetermined area within the FIFO buffer 23.

Each time the synchronism evaluation section 204 detects start timing SOF of the USB frame, the section 204 takes in write address WADR and read address RADR currently supplied to the FIFO buffer 23, then calculates, on the basis of a difference between these two addresses, a specific quantity of the data remaining to be read out from the FIFO buffer 23 (i.e., yet-to-be-read data in the FIFO buffer 23), and thereby determines whether or not there is a likelihood of an overflow or underflow in the FIFO buffer 23. If there is such a likelihood of an overflow or underflow in the FIFO buffer 23, a frequency control instruction for instructing a modification of a supply rate of the read addresses RADR (data readout rate) is given to the read control section 202. Namely, if the rate of the data readout from the FIFO buffer 23 is higher than the rate of the data write into the FIFO buffer 23 and there is a likelihood of an underflow, the synchronism evaluation section 204 gives the read control section 202 a frequency control instruction for lowering the supply rate of the read addresses RADR. Conversely, if the rate of the data readout from the FIFO buffer 23 is lower than the rate of the data write into the FIFO buffer 23 and there is a likelihood of an overflow, the synchronism evaluation section 204 gives the read control section 202 a frequency control instruction for raising the supply rate of the read addresses RADR.

Here, the determination as to the likelihood of the overflow or underflow is made on the basis of a synchronization point (a value represented by synchronization information) designated by the synchronization point control section 205. The synchronization point is a read address RADR of the FIFO buffer 23 at the USB frame start timing SOF on the assumption that the AC 3 coded data or "0" data are being read out from the FIFO buffer 23 at an ideal data readout rate suiting the rate of the data write into the FIFO buffer 23. The synchronism evaluation section 204 determines whether issuance of the frequency control instruction is necessary or not, depending on whether Mathematical Expression (1) below is satisfied or not.

$$|(\text{buffer size} - \text{empty capacity of the buffer}) - \text{synchronization point}| < \text{allowable value } \alpha \quad \text{Mathematical Expression (1)}$$

In Mathematical Expression (1) above, the first term "(buffer size—empty capacity of the buffer)" on the left side represents the quantity of the data written into the FIFO buffer 23 but remaining to be read out from the FIFO buffer 23 (i.e., yet-to-be-read data in the buffer 23), which can be calculated from the write address WADR and read address RADR.

Each time the USB frame start timing SOF is detected, the synchronization point control section 205 calculates the synchronization point and supplies the calculated synchronization point to the synchronism evaluation section 204. Normally, an address value calculated by subtracting a predetermined offset from the write address WADR at the detection time point of the USB frame start timing SOF is set as the synchronization point. However, in this embodiment, operations are performed, at synchronized frame changeover timing and in several subsequent USB frames, for modifying the normal synchronization point to be designated to the synchronism evaluation section 204 or gradually restoring the modified synchronization point to the initial or normal synchronization point, as will be later detailed in a description on behavior of the instant embodiment.

Figure 3:
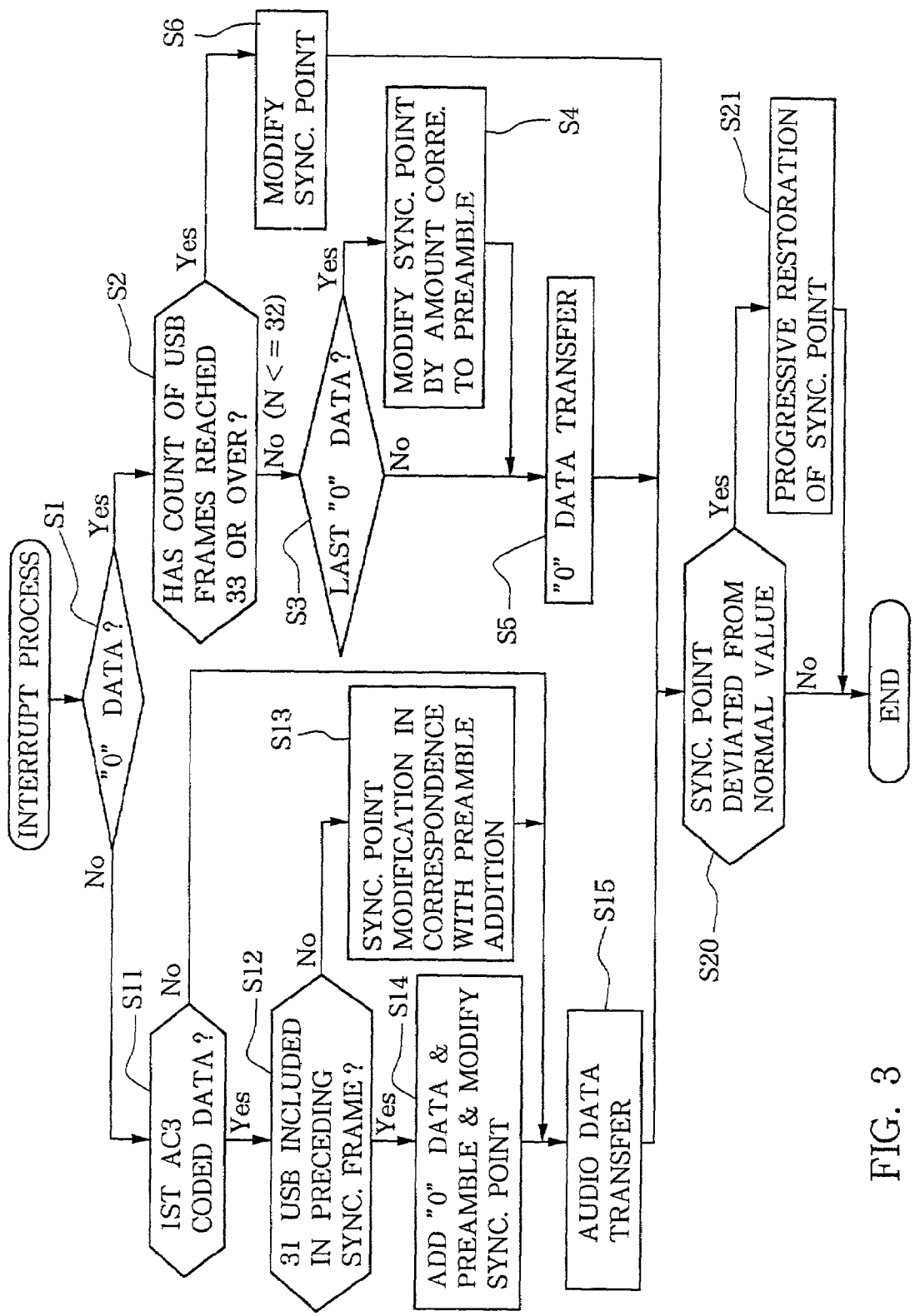
FIG. 3 is a flow chart explanatory of how the embodiment of FIG. 1 operates.
Figure 4:
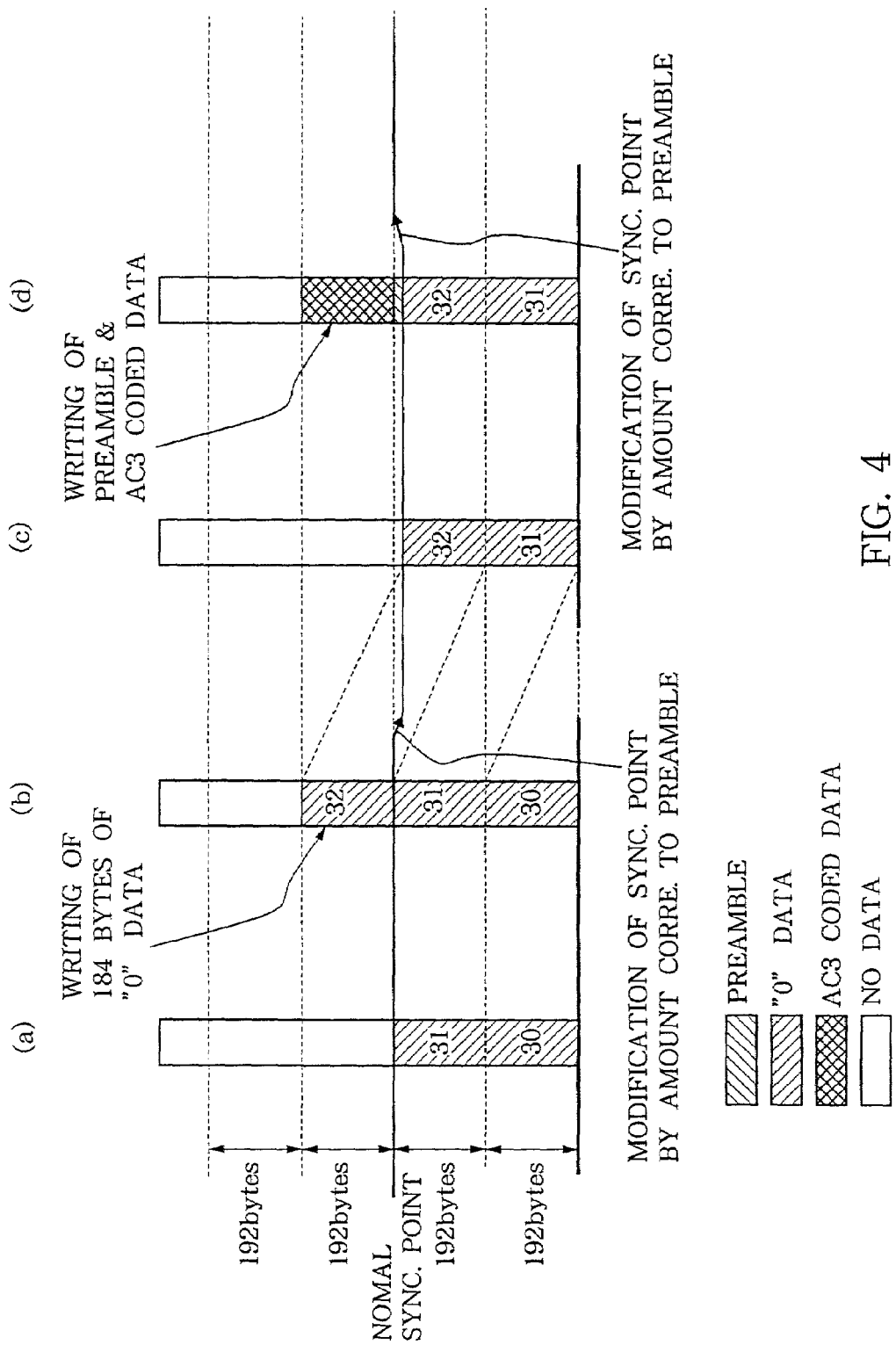
FIG. 4 is a diagram explanatory of a manner in which synchronization point control is performed in the embodiment.
Figure 5:
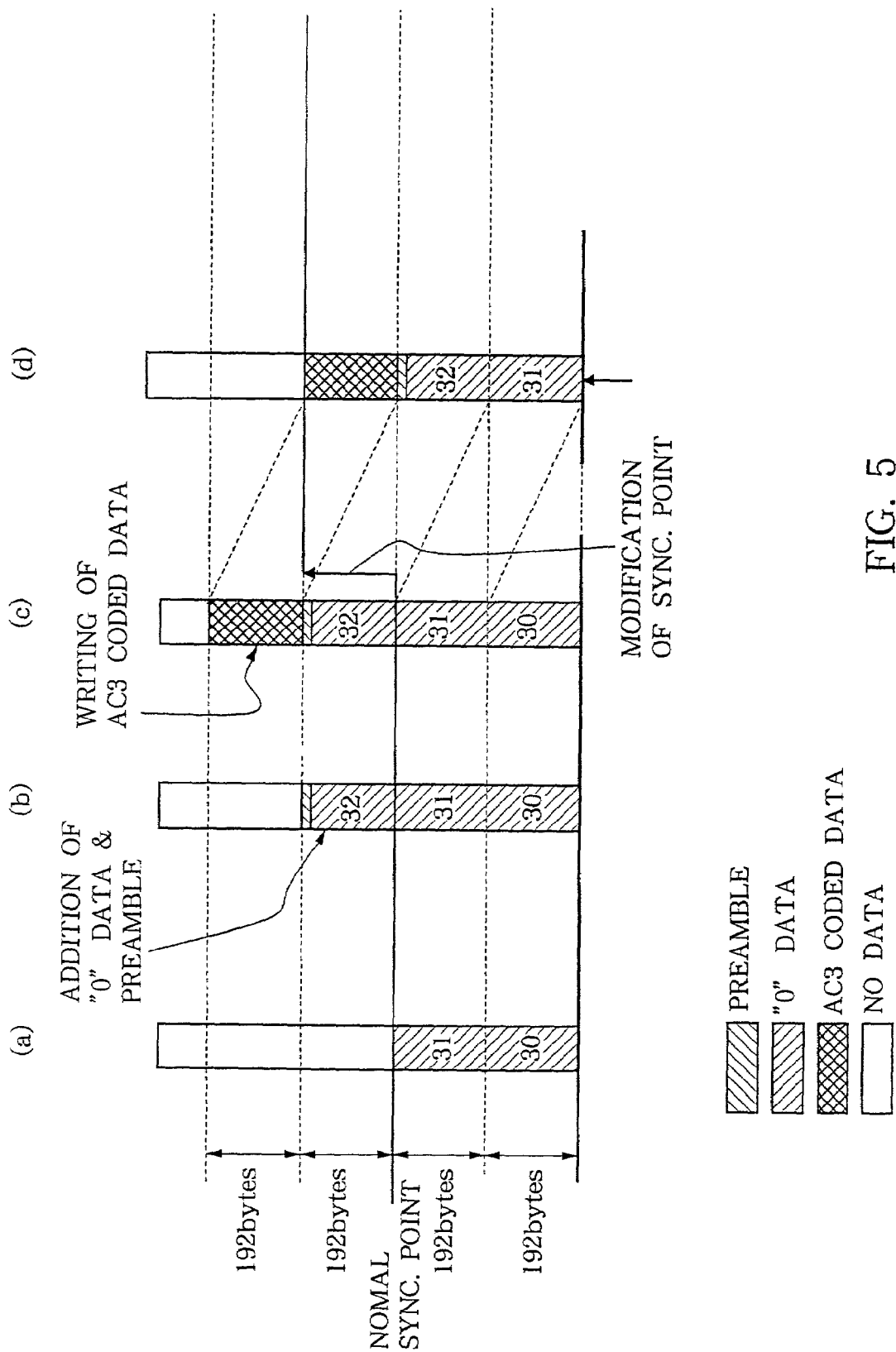
FIG. 5 is a diagram also explanatory of the synchronization point control in the embodiment.
Figure 6:
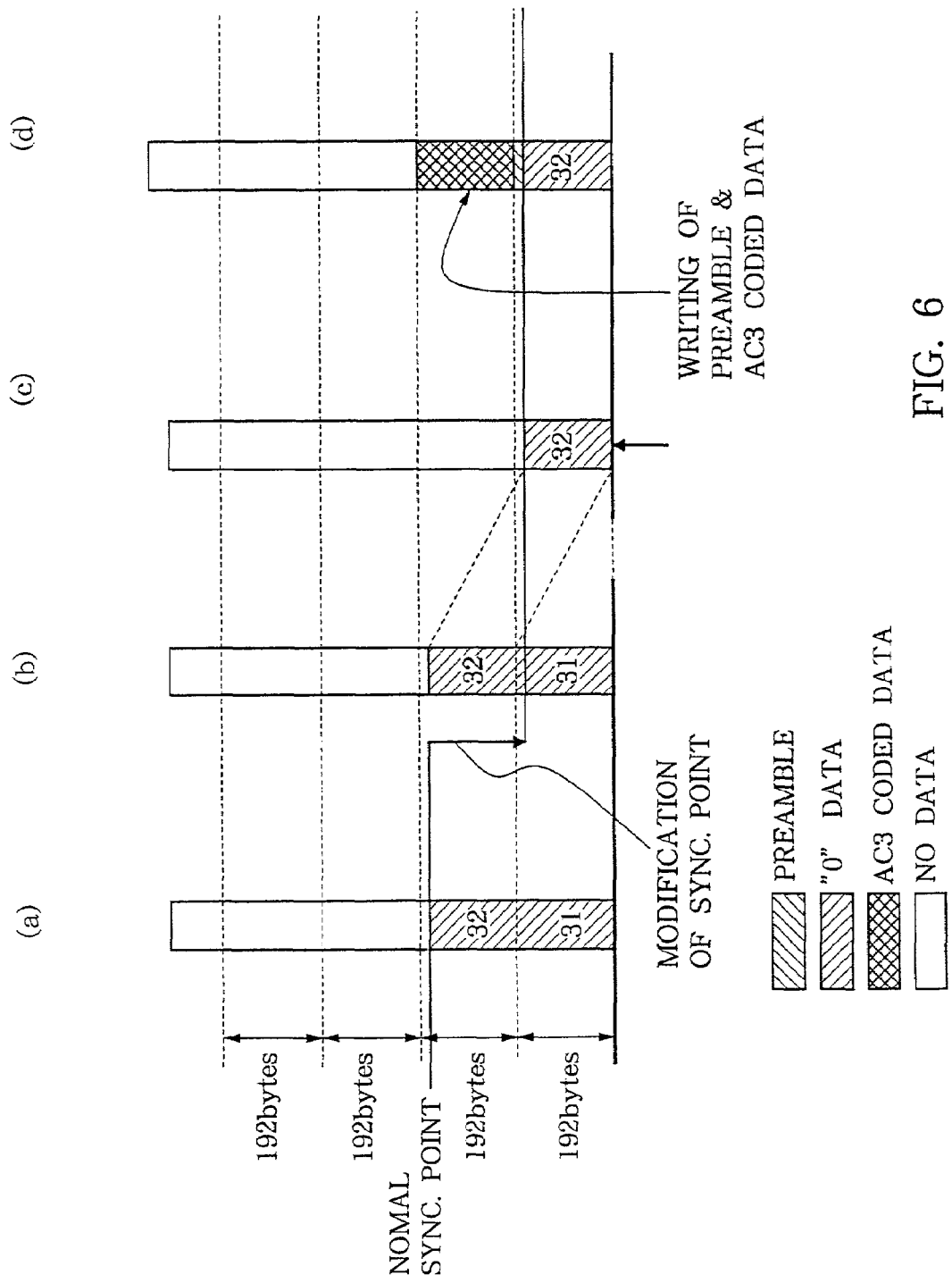
FIG. 6 is a diagram also explanatory of the synchronization point control in the embodiment.

FIG. 3 is a flow chart explanatory of how the CPU 21 behaves in the instant embodiment, and FIGS. 4 to 6 are diagrams explanatory of how the synchronization point control section 205 operates in the instant embodiment. Now, a description will be made about the operation of the instant embodiment, with reference to these FIGures.

Each time there occurs a changeover from one USB frame to another, the CPU 21 in the synchronization control circuit 20 counts the number of the USB frames and carries out an interrupt process as flowcharted in FIG. 3. In this interrupt process, the CPU 21 makes a determination, at step S1, as to whether the payload of the USB packet to be sent to the FIFO buffer 23 is "0" data. With an affirmative (YES) determination at step S1, the interrupt process proceeds to step S2.

At step S2, the CPU 21 determines whether or not the count of the USB frames has reached "33" or over. With a negative (NO) determination at step S2, the CPU 21 makes a further determination, at step S3, as to whether the "0" data to be sent to the FIFO buffer 23 is the last "0" data in the synchronized frame in question. Specifically, the determination at step S3 is made as follows. Namely, in a situation where the payload of the USB packet received following the "0" data includes AC 3 coded data, it is judged that the AC 3 coded data is the first AC 3 coded data of a new synchronized frame and the "0" data to be sent to the FIFO buffer 23 is the last "0" data in the synchronized frame immediately preceding the new synchronized frame. If a negative determination is made at step S3, the "0" data in question is transferred to the FIFO buffer 23 at step S5. After completion of the operation at step S5, the CPU 21 goes to step S20 in order to determines whether or not the synchronization point is deviated from the normal value. If the CPU 21 has proceeded from step S3 to step S20 via step S5, this means that no operation has been performed for modifying the synchronization point from the normal value and thus a negative determination is made at step S20, so that the interrupt process is brought to an end.

The following paragraphs describe operations carried out when an affirmative determination is made at step S3, i.e. when the "0" data to be sent to the FIFO buffer 23 is the last "0" data in the synchronized frame in question and the number of the USB frames in the synchronized frame is "32".

In this case, the CPU 21 goes to step S4 by way of step S3, where an operation is carried out as detailed below with reference to FIG. 4. FIG. 4 shows variations of the data storage state and synchronization point in the FIFO buffer 23. Note that to avoid unnecessary complexity of illustration (i.e., for simplicity of illustration), there are shown here only the data storage states of two 384-byte groups preceding and succeeding the respective synchronization points in several storage areas of the FIFO buffer 23; similar illustration of the data storage states is given in FIGS. 5 and 6 to be described later.

Let it be assumed here that the 32nd USB packet of a given synchronized frame is stored in the last stage (i.e., an area for storing the USB packet to be next transferred to the FIFO buffer 23) of the prebuffer 23P. At this time point, the payloads of up to the 31st USB packet received have been stored in the FIFO buffer 23 and the synchronization point has been set at the end point of the payload ("0" data) of the 31st USB packet, as shown in section (a) of FIG. 4. The synchronism evaluation section 204 of FIG. 1 uses this synchronization point to make the determination based on by Mathematical Expression (1).

At step S4, the CPU 21 sets, as the synchronization point of the next USB frame, a position shifted 184 bytes forward (i.e., in a direction toward addresses to be later accessed for data readout) from the previous synchronization point, namely, a position shifted backward from the normal synchronization point of the next USB frame by an amount corresponding to the data length of the preamble (eight bytes) (see (c) and (d) of FIG. 4). Then, at step S5, the CPU 21 transfers 184 bytes of the "0" data, out of 192 bytes of the "0" data included in the payload of the 32nd received USB packet, from the prebuffer 23P to the FIFO buffer 23.

As a result of the above operation, the data storage state of the FIFO buffer 23 changes to one shown in section (b) of FIG. 4. The reason why the 184 bytes of the "0" data, eight bytes less than the 192 bytes, are written into the FIFO buffer 23 as the "0" data of the 32nd USB packet is to previously secure an area in the FIFO buffer 23 for writing an eight-byte preamble in the next USB frame. After completion of the operation at step S5, the CPU 21 proceeds to step S20 of FIG. 3. In this case too, a negative (NO) determination is made at step S20 because the synchronization point has not been shifted from the normal value, so that the interrupt process is brought to an end.

Let's now consider a case where the USB frame switches to another and the first or leading AC 3 coded data of another or new synchronized frame is transferred, in the other USB frame, from the prebuffer 23P to the FIFO buffer 23. In this case, a negative (NO) determination is made at step S1 in the interrupt process, and the CPU 21 branches to step S11.

At step S11, a determination is made as to whether the data to be transferred to the FIFO buffer 23 is the first AC 3 coded data. In this instance, an affirmative (YES) determination is made at step S11, and the CPU 21 stores the current count of the USB frames as the number of the USB frames in the immediately-preceding synchronized frame, then initialize the counted value of the USB frames to "1", and then moves on to step S12. At step S12, the CPU 21 determines whether the number of the USB frames in the immediately-preceding synchronized frame is "31" or not. If answered in the negative at step S12, the CPU 21 proceeds from step S12 to step S13.

At this time point, the payloads of up to the 32nd received USB packet have been stored in the FIFO buffer 23, as shown in section (c) of FIG. 4. The payload of the 32nd received USB packet has 184 bytes, less than the normal number of bytes by the length of the preamble (i.e., eight bytes less than the normal number). However, the synchronization point of the current USB frame has been set, through the operation of step S4 carried out one USB frame earlier, at the position shifted from the normal synchronization point by an amount corresponding to the length of the preamble, i.e. at the end point of the 184-byte "0" data. Then, the synchronism evaluation section 204 of FIG. 1 uses this synchronization point to make the determination based on Mathematical Expression (1) above. This arrangement can reliably prevent an erroneous determination regarding an overflow or underflow in the FIFO buffer 23 even when only bytes of the "0" data, less than the normal by eight bytes, have been written at the end of the immediately-preceding synchronized frame.

After the synchronism determination or evaluation is completed by the synchronism evaluation section 204, the CPU 21 creates a preamble by reading out the 192-byte AC 3 coded data of the first USB packet stored in the prebuffer 23P, then writes the thus-created preamble into the FIFO buffer 23, and then restores the synchronization point to the normal position by shifting the synchronization point by eight bytes (step S13). After that, the CPU 21, at step S15, writes the first AC 3 coded data of the synchronized frame into the FIFO buffer 23 following the location where the preamble has been written. As a result of the above operation, the data storage state of the FIFO buffer 23 changes to one shown in section (d) of FIG. 4. After completion of the operation at step S15, the CPU 21 proceeds to step S20, where a negative (NO) determination is made and thus the interrupt process is brought to an end.

Next, a description will be made about operations carried out when the "0" data to be sent to the FIFO buffer 23 at the beginning of the interrupt process is the last "0" data in the synchronized frame and the number of the USB frames in the synchronized frame is "31".

In this case, the first AC 3 coded data of the next synchronized frame is detected at step S1 before the last "0" data in the synchronized frame in question is detected at step S3 (namely, when the count of the USB frames is smaller than "31"). Thus, an affirmative determination is made at each of steps S11 and S12, so that the CPU 21 moves on to step S14. At step S14, an operation is performed for adding "0" data and preamble and also modifying the synchronization point in correspondence with the addition. The operation of step S14 will be detailed below with reference to FIG. 5.

Let it be assumed here that the first USB packet of the new synchronized frame has been received and stored in the prebuffer 23P. At this time point, the payloads of up to the 31st received USB packet in the immediately-preceding synchronized frame have been stored in the FIFO buffer 23, as shown in section (a) of FIG. 5. Because the CPU 21 has detected, at step S11, that the first AC 3 coded data of the new synchronized frame has been received, the CPU 21 creates an eight-byte preamble to be added to the first AC 3 coded data (192 bytes). Then, the 184-byte "0" data and eight-byte preamble are written into the FIFO buffer 23. As a result of this operation, the data storage state of the FIFO buffer 23 changes to one shown in section (b) of FIG. 5. After that, the CPU 21 writes the first AC 3 coded data (192 bytes), read out from the prebuffer 23P, into the FIFO buffer 23. As a result of this operation, the data storage state of the FIFO buffer 23 changes to one shown in section (c) of FIG. 5. The above data storage operation corresponds to storing, in one USB frame, data 192 bytes more than the normal quantity, so that the CPU 21 shifts the synchronization point of the next USB frame by an amount corresponding to the 192 bytes. The foregoing is the operation at step S14

After completion of such an operation at step S14, the first AC 3 coded data of the new synchronized frame is transferred, at next step S15, from the prebuffer 23P to the FIFO buffer 23, so that the data storage state of the FIFO buffer 23 changes to one shown in section (d) of FIG. 5. After completion of the operation at step S15, the CPU 21 goes to step S20 in order to make a determination as to whether the synchronization point is deviated from the initial value. After execution of the operation of step S14, the synchronization point has been shifted 192 bytes forward (i.e., in the direction toward addresses to be later accessed for data readout) from the normal value. Thus, an affirmative determination is made at step S20, so that the CPU 21 carries out an operation of step S21. Namely, at step S21, the CPU 21 restores the current synchronization point, shifted from the normal value, to the normal value by progressively shifting it backward, e.g. a predetermined number of bytes per USB frame. After completion of the operation at step S21, the interrupt process is brought to an end.

The following paragraphs describe operations carried out when the "0" data to be sent to the FIFO buffer 23 at the beginning of the interrupt process is the last "0" data in the synchronized frame and the count of the USB frames in the synchronized frame has reached "33".

In this case, an affirmative determination is made at each of steps S1 and S2 in the interrupt process, so that the CPU 21 goes to step S6. At step S6, the CPU 21 shifts the synchronization point backward by an amount corresponding to the data length of the preamble (i.e., eight bytes) (see section (a) of FIG. 6) and further shifts the synchronization point backward by an amount corresponding to 192 bytes (see section (b) of FIG. 6). Thus, the interrupt process is brought to an end, without performing the operation of step S5 directed to transferring the "0" data to the FIFO buffer 23.

Then, when the USB frame changes to the next one and the first AC 3 coded data of the synchronized frame is to be transferred to the FIFO buffer 23, a negative determination is made at step S1 and an affirmative determination is made at each of steps S11 and S12, so that the CPU 21 moves on to step S13. At step S13, the CPU 21 creates a preamble on the basis of the first AC 3 coded data now stored in the prebuffer 23P, and then writes the thus-created preamble into the FIFO buffer 23. After that, the CPU 21 transfers the read-out first AC 3 coded data to the FIFO buffer 23, at step S15. As a result of this operation, the data storage state of the FIFO buffer 23 changes to one shown in section (d) of FIG. 6.

After completion of the operation at step S15, the CPU 21 goes to step S20 in order to make a determination as to whether the synchronization point is deviated from the normal value. In this case, an affirmative determination is made at step S20, so that the CPU 21 returns the current synchronization point, shifted from the normal value, to the normal value by progressively shifting it forward, e.g. a predetermined number of bytes per USB frame. After completion of the operation at step S21, the interrupt process is brought to an end.

When the second or any other subsequent AC 3 coded data is to be transferred to the FIFO buffer 23, the CPU 21 goes to step S15 by way of steps S1 and S11, where the AC 3 coded data is transferred to the FIFO buffer 23. Here, if the synchronization point is deviated from the initial value, the synchronization point is progressively shifted toward the initial value at step S21.

In summary, the present invention is characterized in that, in a case where data isochronously transferred from a transmitting end are to be buffered via a FIFO buffer and then output from the FIFO buffer collectively per predetermined period and conformity between a rate of data write into the FIFO buffer and a rate of data readout from the FIFO buffer is likely to be lost, the invention manipulates a synchronization point to be used for evaluating or testing synchronism between the data write and readout, and thereby prevents an erroneous determination regarding an underflow or overflow in the FIFO buffer. With such arrangements, the present invention permits appropriate synchronized reproduction of received data without adverse effects on the synchronism evaluation.

What is claimed is:

1. A synchronization control device for sequentially receiving packet data in synchronism with periodic bus clock pulses and outputting one or more received packet data collectively as a data train for each synchronized frame having a period longer than a generating period of the bus clock pulses, said synchronization control device comprising:
   a first-in-first-out buffer;
   a write control section that writes received packet data or zero data into said first-in-first-out buffer in synchronism with the bus clock pulses;
   a read control section that reads out yet-to-be-read data from said first-in-first-out buffer;
   a synchronism evaluation section that, when a difference between a specific quantity of the yet-to-be-read data in said first-in-first-out buffer and a value represented by synchronization point information is outside an allowable range, controls a data readout rate of said read control section in such a manner that the difference falls within the allowable range; and
   a synchronization point control section that supplies the synchronization point information to said synchronism evaluation section, said synchronization point control section detecting leading packet data from among a plurality of successive packet data sequentially arriving in synchronism with the bus clock pulses, wherein when a period from the detected leading packet data to a next detected leading packet data has become shorter than the period of the synchronized frame, said synchronization point control section inserts a predetermined quantity of zero data immediately before the next detected leading packet data in said first-in-first-out buffer.

2. A synchronization control device as claimed in claim 1 wherein said synchronization point control section performs control to decrease the value of the synchronization point information by a predetermined amount and then progressively restore the synchronization point information to an initial value.

3. A synchronization control device for sequentially receiving packet data in synchronism with periodic bus clock pulses and outputting one or more received packet data collectively as a data train for each synchronized frame having a period longer than a generating period of the bus clock pulses, said synchronization control device comprising:
   a first-in-first-out buffer;
   a write control section that writes received packet data or zero data into said first-in-first-out buffer in synchronism with the bus clock pulses;
   a read control section that reads out yet-to-be-read data from said first-in-first-out buffer;
   a synchronism evaluation section that, when a difference between a specific quantity of the yet-to-be-read data in said first-in-first-out buffer and a value represented by synchronization point information is outside an allowable range, controls a data readout rate of said read control section in such a manner that the difference falls within the allowable range; and
   a synchronization point control section that supplies the synchronization point information to said synchronism evaluation section, said synchronization point control section detecting leading packet data from among a plurality of successive packet data sequentially arriving in synchronism with the bus clock pulses, wherein when a period from the detected leading packet data to a next detected leading packet data has become longer than the period of the synchronized frame, said synchronization point control section increases the value of the synchronization point information by a predetermined amount.

4. A synchronization control device as claimed in claim 3 wherein said synchronization point control section performs control to progressively restore the synchronization point information to an initial value after having increased the value of the synchronization point information by the predetermined amount.

5. A synchronization control device for sequentially receiving packet data in synchronism with periodic bus clock pulses and outputting one or more received packet data collectively as a data train for each synchronized frame having a period longer than a generating period of the bus clock pulses, said synchronization control device comprising:
   a first-in-first-out buffer;
   a write control section that writes received packet data or zero data into said first-in-first-out buffer in synchronism with the bus clock pulses;

a read control section that reads out yet-to-be-read data from said first-in-first-out buffer;

a synchronism evaluation section that, when a difference between a specific quantity of the yet-to-be-read data in said first-in-first-out buffer and a value represented by synchronization point information is outside an allowable range, controls a data readout rate of said read control section in such a manner that the difference falls within the allowable range;

a preamble generation section that generates a preamble on the basis of leading packet data from among a plurality of successive packet data arriving in synchronism with the bus clock pulses; and a synchronization point control section that supplies the synchronization point information to said synchronism evaluation section, wherein when said synchronization point control section detects the leading packet data from among the plurality of successive packet data sequentially arriving in synchronism with the bus clock pulses, said synchronization point control section shifts the value of the synchronization point information by an amount corresponding to a data length of the preamble to thereby supply the shifted value of the synchronization point information to said synchronism evaluation section and then restores the synchronization point information to an initial value after synchronism evaluation by said synchronism evaluation section.

6. A synchronization control device for sequentially receiving packet data in synchronism with periodic bus clock pulses and outputting one or more received packet data collectively as a data train for each synchronized frame having a period longer than a generating period of the bus clock pulses, said synchronization control device comprising:

first-in-first-out buffer means;

write control means for writing received packet data or zero data into said first-in-first-out buffer means in synchronism with the bus clock pulses;

read control means for reading out yet-to-be-read data from said first-in-first-out buffer means;

synchronism evaluation means for, when a difference between a specific quantity of the yet-to-be-read data in said first-in-first-out buffer means and a value represented by synchronization point information is outside an allowable range, controlling a data readout rate of said read control means in such a manner that the difference falls within the allowable range; and synchronization point control means for supplying the synchronization point information to said synchronism evaluation means, said synchronization point control means detecting leading packet data from among a plurality of successive packet data sequentially arriving in synchronism with the bus clock pulses, wherein when a period from the detected leading packet data to a next detected leading packet data has become shorter than the period of the synchronized frame, said synchronization point control means inserts a predetermined quantity of zero data immediately before the next detected leading packet data in said first-in-first-out buffer means.

7. A synchronization control device as claimed in claim 6 wherein said synchronization point control means performs control to decrease the value of the synchronization point information by a predetermined amount and then progressively restore the synchronization point information to an initial value.

8. A synchronization control device for sequentially receiving packet data in synchronism with periodic bus clock pulses and outputting one or more received packet data collectively as a data train for each synchronized frame having a period longer than a generating period of the bus clock pulses, said synchronization control device comprising:

first-in-first-out buffer means;

write control means for writing received packet data or zero data into said first-in-first-out buffer means in synchronism with the bus clock pulses;

read control means for reading out yet-to-be-read data from said first-in-first-out buffer;

synchronism evaluation means for, when a difference between a specific quantity of the yet-to-be-read data in said first-in-first-out buffer means and a value represented by synchronization point information is outside an allowable range, controlling a data readout rate of said read control means in such a manner that the difference falls within the allowable range; and synchronization point control means for supplying the synchronization point information to said synchronism evaluation means, said synchronization point control means detecting leading packet data from among a plurality of successive packet data sequentially arriving in synchronism with the bus clock pulses, wherein when a period from the detected leading packet data to a next detected leading packet data has become longer than the period of the synchronized frame, said synchronization point control means increases the value of the synchronization point information by a predetermined amount.

9. A synchronization control device as claimed in claim 8 wherein said synchronization point control means performs control to progressively restore the synchronization point information to an initial value after having increased the value of the synchronization point information by the predetermined amount.

10. A synchronization control device for sequentially receiving packet data in synchronism with periodic bus clock pulses and outputting one or more received packet data collectively as a data train for each synchronized frame having a period longer than a generating period of the bus clock pulses, said synchronization control device comprising:

first-in-first-out buffer means;

write control means for writing received packet data or zero data into said first-in-first-out buffer means in synchronism with the bus clock pulses;

read control means for reading out yet-to-be-read data from said first-in-first-out buffer means;

synchronism evaluation means for, when a difference between a specific quantity of the yet-to-be-read data in said first-in-first-out buffer means and a value represented by synchronization point information is outside an allowable range, controlling a data readout rate of said read control means in such a manner that the difference falls within the allowable range;

preamble generation means for generating a preamble on the basis of leading packet data from among a plurality of successive packet data arriving in synchronism with the bus clock pulses; and synchronization point control means for supplying the synchronization point information to said synchronism evaluation means, wherein when said synchronization point control means detects the leading packet data from among the plurality of successive packet data sequentially arriving in synchronism with the bus clock pulses, said synchronization point control means shifts the value of the synchronization point information by an amount corresponding to a data length of the preamble to thereby supply the shifted value of the synchronization point information to said synchronism evaluation means and then restores the synchronization point information to an initial value after synchronism evaluation by said synchronism evaluation means.

* * * * *